Patented Aug. 28, 1945

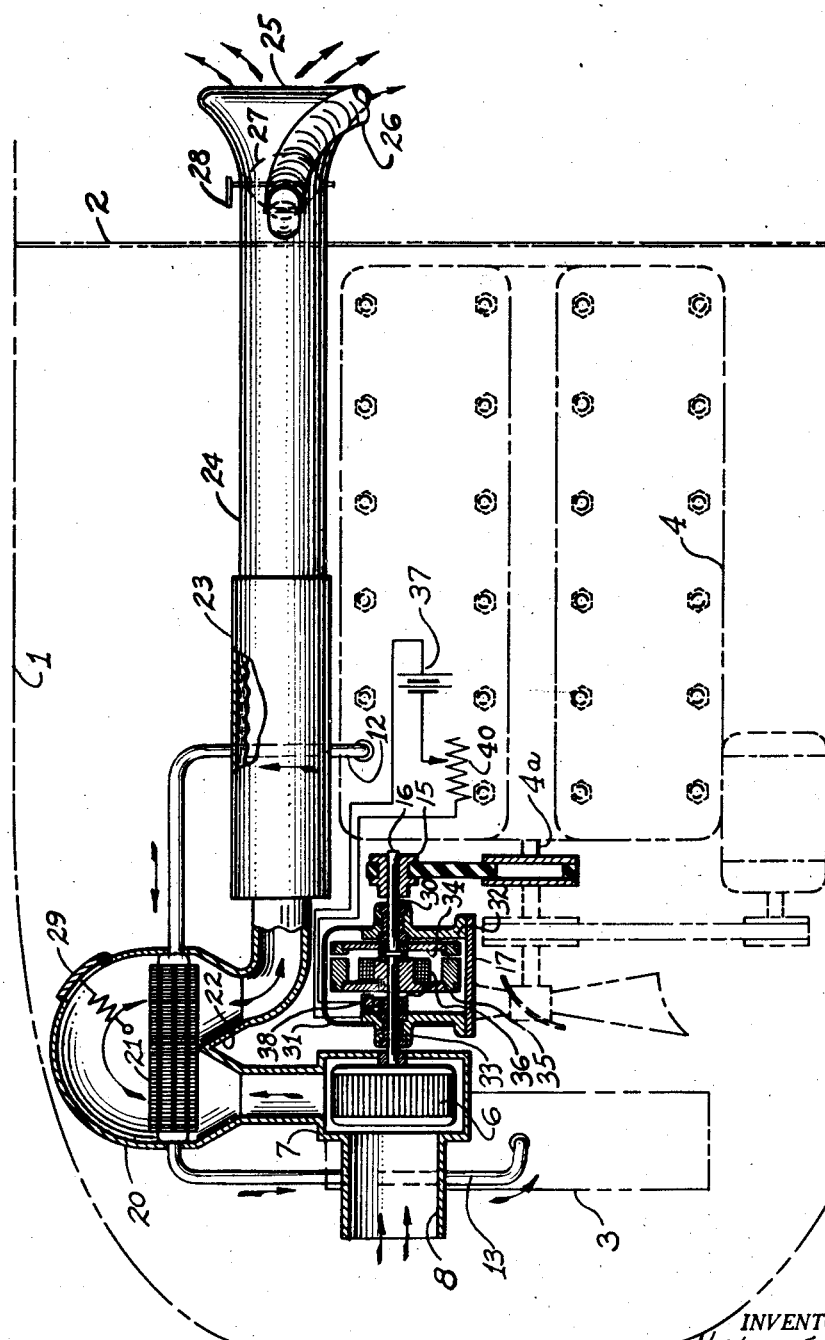

2,383,640

UNITED STATES PATENT OFFICE 2,383,640

HEATING AND VENTILATING APPARATUS FOR MOTOR VEHICLES

Howard J. Findley, Shaker Heights, Ohio, assignor to Eaton Manufacturing Company, Cleveland, Ohio, a corporation of Ohio Application May 24, 1943, Serial No. 488,123

6 Claims. (Cl. 237—12.3)

This invention relates to heating and ventilating automotive vehicles in general, and includes a constant speed drive for compartment heat-exchanger apparatus within the engine compartment of such vehicles.

Heretofore it has been common practice to drive the air impelling means of vehicle compartment heat-exchangers by means of an electric motor which was energized from the vehicle electrical system. With the advent of present day vehicles having numerous electrical accessories all operated from the vehicle electrical system the drain upon the battery has become prohibitive. The present limited output generator has not been increased in size and capacity due to the disproportionate expense involved for the small increase in electrical output. Concurrently with these developments vehicle manufacturers have become conscious of the possibilities of greatly increased output of such air conditioning means for tempering the air of the entire vehicle, not just spot heating; and especially with larger air impellers of substantially noiseless operating characteristics. One solution of this problem has been to remove the generally increasing bulk of the air conditioning means from the area of the vehicle compartment adjacent the passengers' feet to a position beneath the vehicle seat; or disposed completely in the vehicle engine compartment. Disposition of passenger compartment heat-exchangers out of the passengers' way in the engine compartment has naturally suggested use of the vehicle engine as the prime mover for a power take-off means from which to operate such accessories. The present invention provides an efficient means for operation of such equipment at increased output, in a generally noiseless manner, and at a substantially constant speed above a predetermined vehicle engine speed.

Among the objects of the present invention is the provision of vehicle body heat-exchanger instrumentalities disposed within the engine compartment having driving means including a coupling in which variable input speeds occasioned by operative demands of the vehicle engine are converted into selective substantially constant output speeds for operation of the heat-exchanger; and the provision in apparatus as above described, comprising a power take-off means from the vehicle prime mover including a magnetic coupling having a variable input speed and a substantially constant output speed for operation of the air impeller thereof.

Further and other objects and advantages of the present invention reside in the novel combination and arrangement of parts about to be described and will become apparent from the accompanying drawing, forming a part of this specification, and pointed out with particularity in the appended claims.

In the drawing like parts are denoted by corresponding reference characters throughout, and in which:

The single view is a sectional plan view illustrating an embodiment of a heat-exchanger driven from a vehicle engine by a power take-off means thereon comprising a coupling having a variable input speed and producing a substantially constant output speed, according to the teaching of this invention.

Now having reference to the drawing there is shown in broken lines in the background, in surrounding relation to a vehicle body heat-exchanger, a front portion of a vehicle 1 having a dash board 2, the usual vehicle radiator 3 for circulating cooling liquid to the vehicle engine 4, and the vehicle engine-driven fan shaft 4a. An air blower 6 of the radial delivery type enclosed in a housing 7 has an air inlet 8, and in this case is actuated from the engine-driven fan shaft or power take-off 4a by a separate belt and pulley, as shown, through the intermediary of a pulley 15 fixed to a shaft 16 of a variable input speed coupling with a substantially constant output speed, generally designated 17, and to be hereinafter described.

A heat-exchanger casing 20 has an outer wall which diverts air, received from the peripheral air discharge of the blower 6 into the casing inlet, through one portion of a heat-exchanger means 21 transversely disposed therein, and conducts air out of the casing, through another portion of the core divided from the casing air inlet, by a partition wall 22. With this arrangement of a single heat-exchange means all portions thereof are efficiently utilized by providing two passes therethrough. The heat-exchange medium, of course, being first introduced to the core section adjacent the casing air outlet for mildly raising the air temperature passed therethrough and causing the least drop in the temperature of the heat-exchange medium, while the air entering the casing is rapidly changed in temperature by the slightly dissipated or expended heat-exchange medium flowing reversely through the core from the inlet conduit 12, connected to the vehicle engine 4, to the outlet conduit 13 connected with the vehicle radiator 3.

An air silencer 23 has an air inlet, for receiving air flowing from the outlet of the heat-exchanger casing 29, and an outlet connected to an air conveying means 24 which is projected through the vehicle dash 2 into the passenger compartment where it is terminated in diverging spouts 25 and 26 for distribution of tempered air to selected locations, for example compartment heating and windshield defrosting. Valve 27, and control means 28 which may be extended to within convenient reach of the vehicle operator, is disposed in the air conveying means 24 to throttle or shut-off the tempered air supply. When the shut-off valve means 27 is closed, valve means 29 in the outer wall of the heat-exchanger casing 47 is suitably spring loaded to relieve excess pressures thereby produced in the casing to a predetermined safe maximum and thereafter to automatically dump excess air to the atmosphere.

The coupling generally designated 17, driven by the pulley 16 from the engine-driven fan shaft 4a, has an input shaft 30 which is driven at variable speeds occasioned by operative demands of the vehicle engine. The input shaft 30 is suitably journalled within the housing 31 and its frame work 32, and includes a similar axially disposed and journalled output or driven shaft 33 leaving the input shaft 30 freely rotatable with respect to the mechanically uncoupled driven shaft 33. Shaft members 30 and 33 each have an annular disc or ring 34 and 35, respectively, concentrically fixed thereon and axially spaced with respect to each other. The air space between the members 34 and 35 is maintained while the coupling is energized so that slippage between these members can take place during the transmission of torque by the coupling. A coil 36 is concentrically disposed around the shaft within one of the ring members for producing a magnetic flux. Energy for the coil is supplied from the vehicle battery generally designated 37. The current supply means for the coil 36 may include a suitable slip-ring and brush arrangement indicated at 38 in the drawing. A resistance rheostat 40 in the power line may be used to govern the amount of current energizing the coil. Alternatively, a thermostatically controlled switch and valve may be used for summer ventilation by the use of the fan only with the water to the heat-exchanger shut off.

In the coupling construction just enumerated it will be apparent that the input shaft 30 driven from the engine-driven fan shaft 4a will be subjected to various speeds depending upon the operative demands of the vehicle engine while the output or driven shaft 33 of the coupling may be driven at a selective substantially constant speed above idling speeds of the vehicle engine. That is to say, only sufficient electric energy is supplied to the magnetic coil by the rheostat 40 to provide a magnetic field which will carry only a certain load. A suitable fan speed for operation of the heat-exchanger has been selected and above the desired speed the coupling will start to slip.

In operation the current consumption of the magnetic coil is relatively small compared to an electric motor of comparable operating characteristics. It has been found from tests conducted on this substantially constant speed coupling that at speeds of approximately 600–1200 R. P. M. for the engine driven shaft that the output or fan side of the coupling will be driven at approximately like speeds of 600–1200 R. P. M., however, from 1200 R. P. M. to 2500 and up to 3700 R. P. M. engine speeds the output speed of the coupling is only 1300–1450 R. P. M.

From the foregoing disclosures it will now be apparent that there has been revealed a novel engine driven heat-exchanger having a fan drive therefor with a variable input speed and a substantially constant output speed and which includes, among other things, the objects and advantages first enumerated. It is not intended to be limited, however, to the specific embodiment of the drive shown, which is merely by way of illustration, as many modifications will now be suggested in actual practice to those skilled in the art that are formal modifications thereof, and the spirit of the invention is considered commensurate with the scope and substance of the following claims.

What I claim is:

1. In heating and ventilating apparatus for a vehicle having a passenger compartment and a variable speed driving engine provided with a power take-off, a heat-exchange device adapted to receive heat from said engine and having air delivery means connected with said compartment, an air impelling means connected with said heat-exchange device and operable to cause a flow of air through the latter and through said delivery means to said compartment, means operably connecting said impelling means with said power take-off including a magnetic coupling, and means for energizing said magnetic coupling, said coupling being operable with slippage such that said impelling means will be driven at a substantially constant speed for all operating speeds of the engine above a predetermined value and the volume of air delivered to said compartment by the impelling means will be substantially unaffected by variations in the operating speed of the engine above said predetermined value.

2. In heating and ventilating apparatus for a vehicle having a passenger compartment and a variable speed driving engine provided with a power take-off, a heat-exchange device adapted to receive heat from said engine and having air delivery means connected with said compartment, an air impelling means connected with said heat-exchange device and operable to cause a flow of air through the latter and through said delivery means to said compartment, a magnetic coupling having a variable speed input member connected with said power take-off and a substantially constant speed output member connected with said impelling means, and means for energizing said magnetic coupling, said coupling being operable with slippage such that said impelling means will be driven at a substantially constant speed for all operating speeds of the engine above a predetermined value and the volume of air delivered to said compartment by the impelling means will be substantially unaffected by variations in the operating speed of the engine above said predetermined value.

3. In heating and ventilating apparatus for a vehicle having a passenger compartment and a variable speed driving engine provided with a power take-off, a heat-exchange device adapted to receive heat from said engine and having air delivery means connected with said compartment, an air impelling means connected with said heat-exchange device and operable to cause a flow of air through the latter and through said delivery means to said compartment, means operably connecting said impelling means with said power take-off including a magnetic coupling operable with slippage such that said impelling means will be driven at a selected substantially constant speed for all operating speeds of the engine above a predetermined value and the volume of air delivered to said compartment by the impelling means will be substantially unaffected by variations in the operating speed of the engine above said predetermined value, and a circuit for energizing said magnetic coupling and including variable means for obtaining an energization of the coupling corresponding with said selected substantially constant speed.

4. In heating and ventilating apparatus for a vehicle having a passenger compartment and an engine compartment containing a liquid-cooled variable speed driving engine, said engine being provided with a power take-off and a liquid-containing cooling radiator, a heat-exchange device having a core which is connected with said engine and radiator for a circulation of heated liquid and also having air delivery means connected with said passenger compartment, an air impelling means connected with said heat-exchange device and operable to cause a flow of air through the latter and through said delivery means to said passenger compartment, means operably connecting said impelling means with said power take-off including a magnetic coupling, and means for energizing said magnetic coupling, said coupling being operable with slippage such that said impelling means will be driven at a substantially constant speed for all operating speeds of the engine above a predetermined value and the volume of air delivered to said passenger compartment by the impelling means will be substantially unaffected by variations in the operating speed of the engine above said predetermined value.

5. In heating and ventilating apparatus for a vehicle having a passenger compartment and a variable speed driving engine provided with a power take-off, a heat-exchange device adapted to receive heat from said engine and having air delivery means connected with said compartment, an air impelling means connected with said heat-exchange device and operable to cause a flow of air through the latter and through said delivery means to said compartment, means operably connecting said air impelling means with said power take-off including a magnetic coupling, means for energizing said magnetic coupling, said coupling being operable with slippage such that said impelling means will be driven at a substantially constant speed for all operating speeds of the engine above a predetermined value and the volume of air delivered to said compartment by the impelling means will be substantially unaffected by variations in the operating speed of the engine above said predetermined value, and valve means for controlling the delivery of air to said passenger compartment from said heat-exchange device.

6. In heating and ventilating apparatus for a vehicle having a passenger compartment and an engine compartment containing a liquid-cooled variable speed driving engine, said engine being provided with a power take-off at one end thereof and a liquid-containing cooling radiator adjacent said power take-off, a heat-exchange device located immediately adjacent said radiator and having a core which is connected with said engine and radiator for a circulation of heated liquid, an air delivery conduit connecting said heat-exchange device with said passenger compartment, an air impelling means located immediately adjacent said one end of the engine and connected with said heat-exchange device and operable to cause a flow of air through the latter and through said conduit to said passenger compartment, means operably connecting said impelling means with said power take-off including a magnetic coupling, and means for energizing said magnetic coupling, said coupling being operable with slippage such that said impelling means will be driven at a substantially constant speed for all operating speeds of the engine above a predetermined value and the volume of air delivered to said passenger compartment by the impelling means will be substantially unaffected by variations in the operating speed of the engine above said predetermined value.

HOWARD J. FINDLEY.